US006840847B2

(12) United States Patent
Vatterott et al.

(10) Patent No.: US 6,840,847 B2
(45) Date of Patent: Jan. 11, 2005

(54) DEVICE FOR POLISHING DIGITAL STORAGE DISCS

(75) Inventors: Rolf Vatterott, Bad Urach - Wittlingen (DE); Paul Bodlée, Aichtal-Grötzingen (DE)

(73) Assignee: Peter Wolters Werkzeugmaschinen GmbH, Rendsburg (DE)

(*) Notice: Subject to any disclaimer, the term of this patent is extended or adjusted under 35 U.S.C. 154(b) by 0 days.

(21) Appl. No.: 10/624,060

(22) Filed: Jul. 21, 2003

(65) Prior Publication Data

US 2004/0023605 A1 Feb. 5, 2004

(30) Foreign Application Priority Data

Aug. 1, 2002 (DE) .......................... 102 35 017

(51) Int. Cl.[7] ................................. B24B 7/00
(52) U.S. Cl. ................. 451/287; 451/288; 451/290; 451/291
(58) Field of Search .................... 451/41, 270, 271, 451/285, 287, 288, 290, 291

(56) References Cited

U.S. PATENT DOCUMENTS

| 5,123,218 A | * | 6/1992 | Karlsrud | ............... 451/63 |
|---|---|---|---|---|
| 6,033,522 A | * | 3/2000 | Iwata et al. | ........... 156/345.12 |
| 6,280,296 B1 | * | 8/2001 | Sato et al. | ................ 451/41 |
| 6,594,848 B1 | * | 7/2003 | Lee | ................... 15/102 |
| 2002/0172124 A1 | * | 11/2002 | Weng | ................... 369/72 |
| 2003/0124962 A1 | * | 7/2003 | Lee | ................... 451/242 |
| 2003/0129932 A1 | * | 7/2003 | Ficarro | ................ 451/288 |
| 2003/0181141 A1 | * | 9/2003 | Taniguchi et al. | ........... 451/36 |

* cited by examiner

Primary Examiner—M. Rachuba
(74) Attorney, Agent, or Firm—Vidas, Arrett & Steinkraus PA

(57) ABSTRACT

A device for polishing digital storage discs including a polishing plate rotatably driven about a vertical axis, the upper side of which has a polishing cloth, wherein the polishing cloth is interrupted by a ring-shaped recess concentric with the axis of the polishing plate, at least one circular load-applying plate from the planar lower side of which a projection centrally protrudes to appropriately engage the central hole of the storage disk, a roller holder which has at least one idling roller and one driven roller against which the circumference of said load-applying plate gets into engagement when said plate is carried along while lying on said polishing plate, a drive for said driven roller, and mechanism for feeding a polishing medium to said polishing cloth.

18 Claims, 4 Drawing Sheets

DEVICE FOR POLISHING DIGITAL STORAGE DISCS

CROSS-REFERENCE TO RELATED APPLICATION

Not Applicable

STATEMENT REGARDING FEDERALLY SPONSORED RESEARCH

Not Applicable

BACKGROUND OF THE INVENTION

CD's, DVD's or similar optically readable discs storage discs are formed from a suitable plastic material and are "written on" subsequently. The area on one side on which a written record or sound record is made leaves a vacant area which is concentric with the central opening and adjacent thereto.

What frequently occurs is that damage is caused to the area bearing a written record or sound record on such a storage disc. The result of merely a slight damage in the form of scratches or the like can be already that the playback can no longer be effected without faults or is no longer possible. This can be counteracted by polishing the storage disc.

It is the object of the invention to provide a device for polishing digital storage discs which allows polishing a plurality of storage discs at a time in a simple machining manner.

BRIEF SUMMARY OF THE INVENTION

The inventive device has a polishing plate rotatably driven about a vertical axis the upper side of which has a polishing cloth. Polishing plates with a polishing cloth to which a polishing medium is fed are known as such for the various applications.

The polishing cloth of the invention is interrupted by a ring-shaped recess of the polishing plate that is arranged concentrically with the axis of the polishing plate. The disc to be polished is held, with regard to the arrangement described for the polishing cloth, in such a way that the central area which is not to be polished is located above the ring-shaped recess. Further, according to the invention, at least one circular load-applying plate is provided the planar lower side of which is centrally fitted with a slightly protruding projection to appropriately engage the central hole of the storage disk. During loading, the storage disk is positioned on the polishing plate and the load-applying plate is centrically placed onto the storage disk. To accomplish a relative motion while the polishing plate rotates the load-applying plate is prevented from being carried along by the polishing plate by means of two radially spaced rollers which are supported on a roller holder. One roller is an idling roller whereas the other roller is driven by an appropriate drive. During the polishing procedure, the load-applying plate is pressed against the two rollers by its circumference. Furthermore, the load-applying plate is rotated by means of the driven roller, by which an efficient polishing operation is achieved.

The position of said rollers is such that the projection of said load-applying plate is located above said ring-shaped recess when said load-applying plate bears on the rollers. What can be deduced from the description of the inventive device is that the storage disks which need polishing can be loaded and unloaded in a simple way. The polishing procedure itself is automatic and can be terminated either manually by an operator or even automatically via an appropriate program. The inventive device is of an extremely simple construction and, therefore, involves little manufacturing expenditure. It is understood that it is an advantage, in particular, that a major number of load-applying plates which are evenly spaced are on the polishing plate to allow a major number of storage discs to be polished at a time. The roller holders are preferably arranged at equal spacings above the polishing plate.

According to an aspect of the invention, the polishing plate is disposed in a tray. The tray serves for catching the excessive polishing medium which may be passed to a collection container from the tray.

According to an aspect of the invention, the polishing cloth is positioned on two annular surfaces of the polishing plate which are separated by said ring-shaped recess with the polishing plate having an indentation in a tray shape adjacent to the inner annular surface of the polishing plates. Polishing medium may run into this indentation and may flow off through at least one discharge duct leading to the tray surrounding it. This discharge duct preferably crosses the ring-shaped recess so that the polishing medium gathering in the ring-shaped recess may also be discharged therethrough.

According to another aspect of the invention, the polishing medium is fed by means of at least one nozzle arranged above the polishing plate which communicates with a source of polishing medium. The nozzle is preferably adjustable in cross-section to vary the feed volume. The nozzle is led to the polishing cloth via an appropriate flow communication path. Although it is imaginable to use a line or pipe as a flow communication path there is a risk of the path to be jammed. Therefore, an aspect of the invention proves that the flow communication path is formed by a wire along which the polishing medium runs downwards.

Another aspect of the invention provides that a chamber communicating with the source of the polishing medium is arranged above said nozzle and a return line communicates with said chamber to permanently agitate the polishing medium between the source and chamber. The polishing medium may then be fed to the polishing cloth by gravity through at least one nozzle.

A separate drive is useful for the driven roller. It preferably comprises an electric motor which is preferably mounted on the roller holder with the driven roller mounted on the vertical shaft of the electric motor, according to a further aspect of the invention.

The roller holder may be adjustably mounted on a stationary support for setting purposes.

The drive of the load-applying plate is preferably a frictional drive. For this purpose, the driven roller may be circumferentially fitted with at least one flexible ring which frictionally interacts with the circumference of the load-applying plate. For this purpose, the load-applying plate circumferentially may also have a roughened area to improve the frictional engagement.

To prevent the loaded disc from being stuck to the planar lower side of the load-applying plate a suitable cloth is adhered to the lower side of the load-applying plate, according to a further aspect of the invention.

According to a further aspect of the invention, the projection existing on the lower side of the load-applying plate is defined by an exchangeable pin which protrudes only slightly beyond the lower edge of the load-applying plate and the storage disk to make it easier to position the load-applying plate on the memory disc.

BRIEF DESCRIPTION OF THE SEVERAL VIEWS OF THE DRAWINGS

An embodiment of the invention will be explained in more detail below with reference to the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 2:
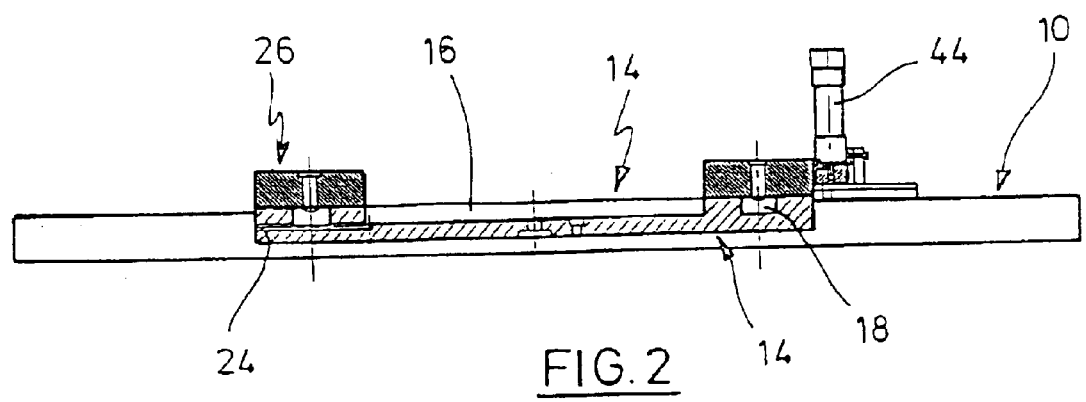
FIG. 2 shows a section through the representation of FIG. 1 along line 2—2 with not all details illustrated.

A tray 10 is shown arranged on a stand 12 drawn in dotted lines. A polishing plate 14 which rotates about a vertical axis is rotatably supported in the centre of the tray. As ensues from the cross-sectional illustration of FIG. 2 the circular polishing plate 14 is centrally fitted with a circular tray-like indentation 16. A ring-shaped groove-like recess 18 which runs concentrically is provided farther towards the edge. Annular surfaces 20, 22 to which a polishing cloth (not shown) is adhered are arranged on the two sides of the ring-shaped recess. Further, a radial bore 24 can be seen which joins the central indentation 16 to the circumference of the polishing plate. The bore 14 crosses the ring-shaped recess 18. As a result, the indentation 16 and the recess 18 communicate with the outer surface of the plate 14 and, hence, the interior of the tray 10.

Eight circular or cylindrical load-applying plates 26 are shown arranged on the polishing plate 14. Their diameter corresponds to the width between the inner periphery of the inner annular surface 22 and the outer periphery of the outer annular surface 20. Their centre is located approximately in the middle of the ring-shaped recess 18. The load-applying plates 26 are held by rollers of eight evenly spaced roller holders 28 which are fixed in an appropriate way. Reference will be made below to the construction of the roller holders 28 and load-applying plates 26.

Figure 4:
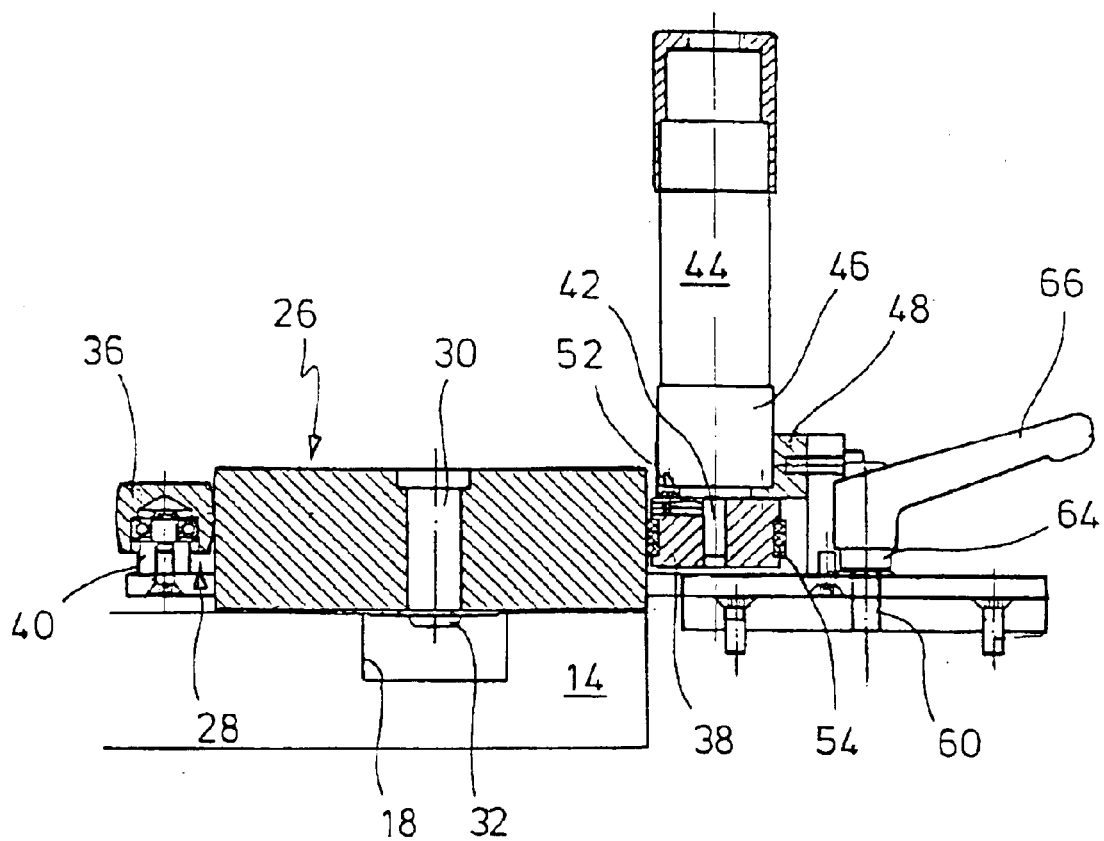
FIG. 4 shows a section through the representation of FIG. 3 along line 4—4.

It can be seen from FIG. 4 that the load-applying plates 26 are massive and centrally receive a pin 30 which slightly protrudes at 32 beyond the planar lower side of the load-applying plate 26. The pin portion 32 is sized so as to appropriately fit into the standardized opening of storage discs, e.g. CD's or DVD's. When the load-applying plate 26 is placed onto such a storage disc the portion 32 will protrude only slightly beyond the lower side of the storage disc. A suitable cloth is adhered to lower side of the load-applying plate 26, which is not shown, however.

The roller holder 28 is formed from a suitable, solid sheet metal material and, on one side, has an arcuated contour 34 which is of approximately the same radius than is the circumference of the load-applying plate 26. At the end of the contour that is left-hand in FIG. 3, an idling roller 36 is rotatably supported about a vertical axis. An the other end, a driven roller 38 rotatably supported about a vertical axis with either roller 36, 38 being in engagement with the circumference of the load-applying plate 26 when the load-applying plate 26 is moved against the roller or roller holder 28. The length of arc between rollers 36, 38 is less than 180°. The roller holder 28 is also arcuated on the opposed side. However, this does not play a role for its operation.

Figure 3:
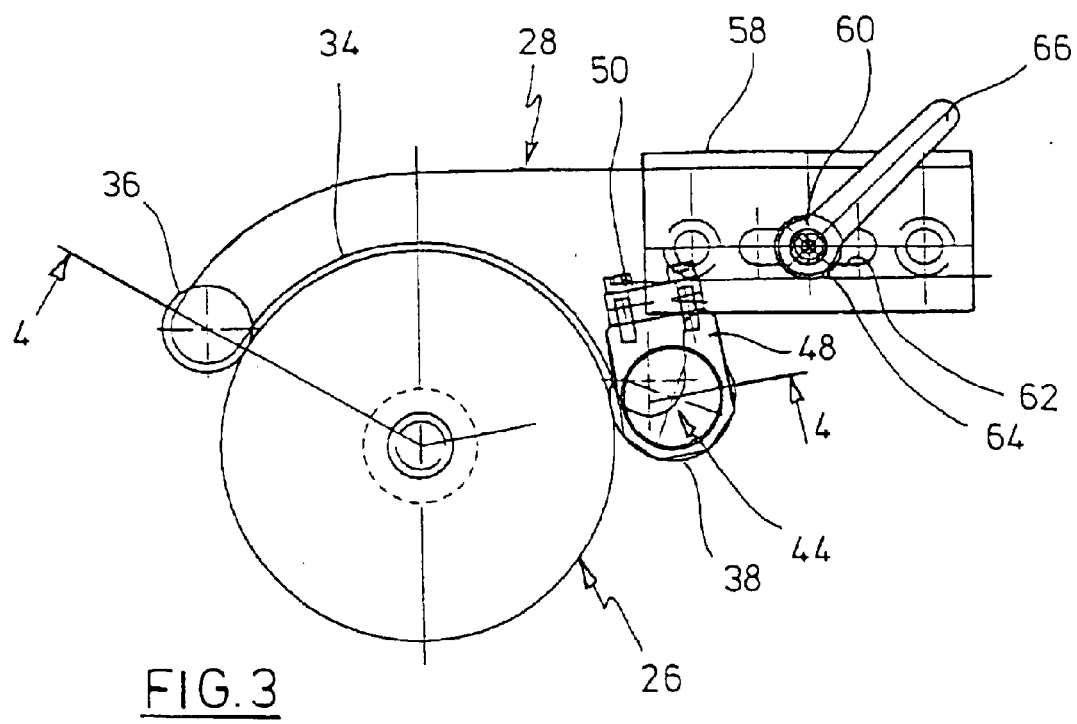
FIG. 3 shows a plan view of a load-applying plate and a roller holder of the device of FIG. 2.

As can be seen from FIG. 4 the idling roller 36 is rotatably supported by means of a stud 40, which is mounted on the roller holder 28, and a roller bearing. The driven roller 38 is seated on the vertical shaft 42 of an electric motor 44 which drives the shaft 42 via a gearing 46. The casing of the geared motor 44, 47 is seated in a circular recess of a retaining component 48 which is appropriately fixed to the roller holder 28 (by a bolted mount 50) as can be seen in FIG. 3. The driven roller 38 is mounted on the shaft 42 by means of a pin screw 52.

Three side-by-side rings 54 which are square-shaped in cross-section and are made of a flexible material are arranged in an appropriate groove at the circumference of the driven roller 38. The outer circumference slightly protrudes beyond the outer circumference of the roller 38. The driven roller 38 is in a frictional engagement with the circumference of the load-applying plate 26 via these rings. The circumference of the load-applying plate 26 may be fitted with a fluting or the like to improve the frictional engagement.

The roller holder 28 is slidingly mounted in a component 58 to enable a displacement of the roller holder 28 in its radial position. A threaded bolt 60 extends through an elongate-hole opening 62 in the component 56 to fix the roller holder 28 in place. Seated on the bolt 60 is a nut 64 on which a handle 66 is mounted to locate the roller holder 28 in a desired position. The mounting of the component 56 as such is not shown in detail.

Figure 1:
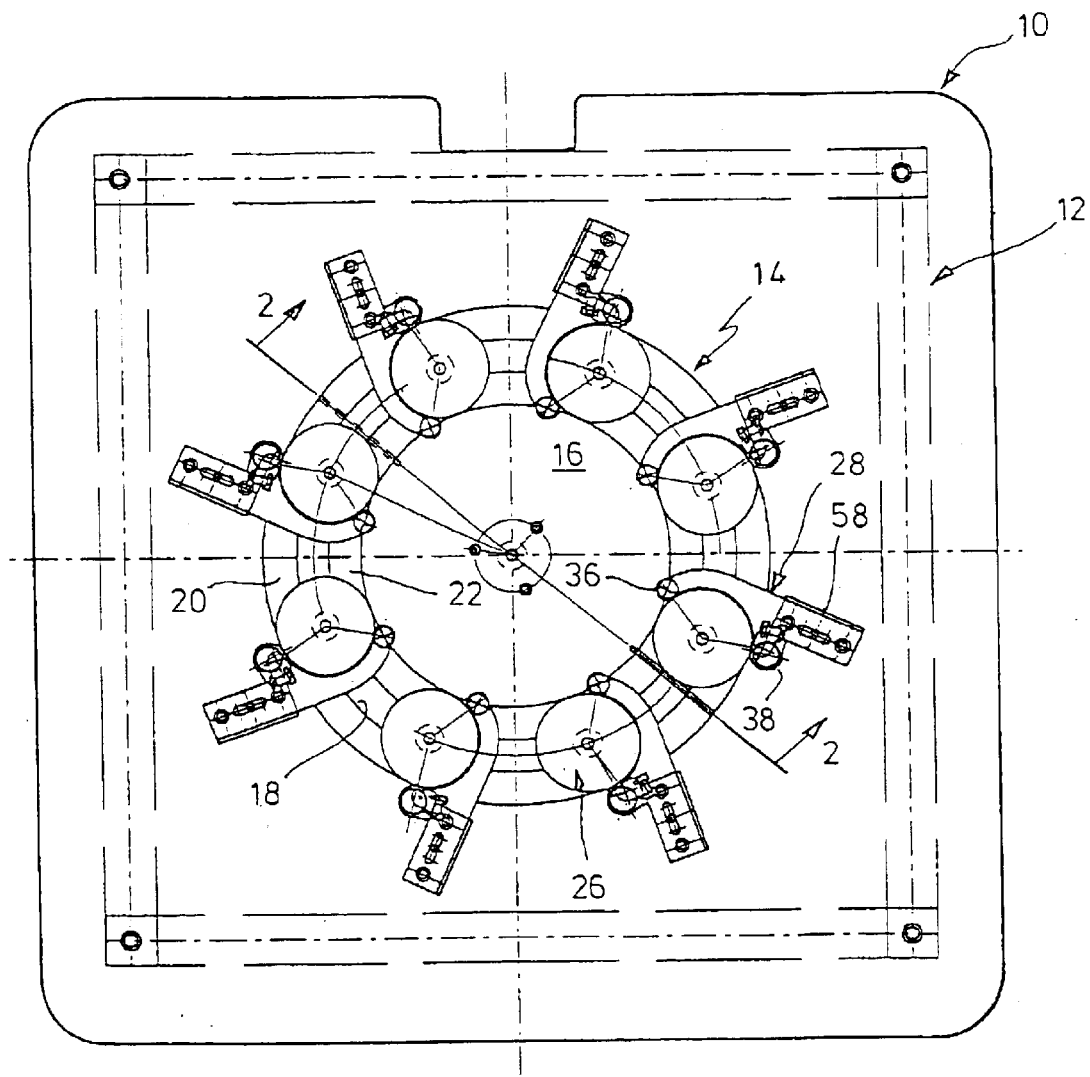
FIG. 1 shows a plan view of a schematically illustrated device according to the invention.
Figure 5:
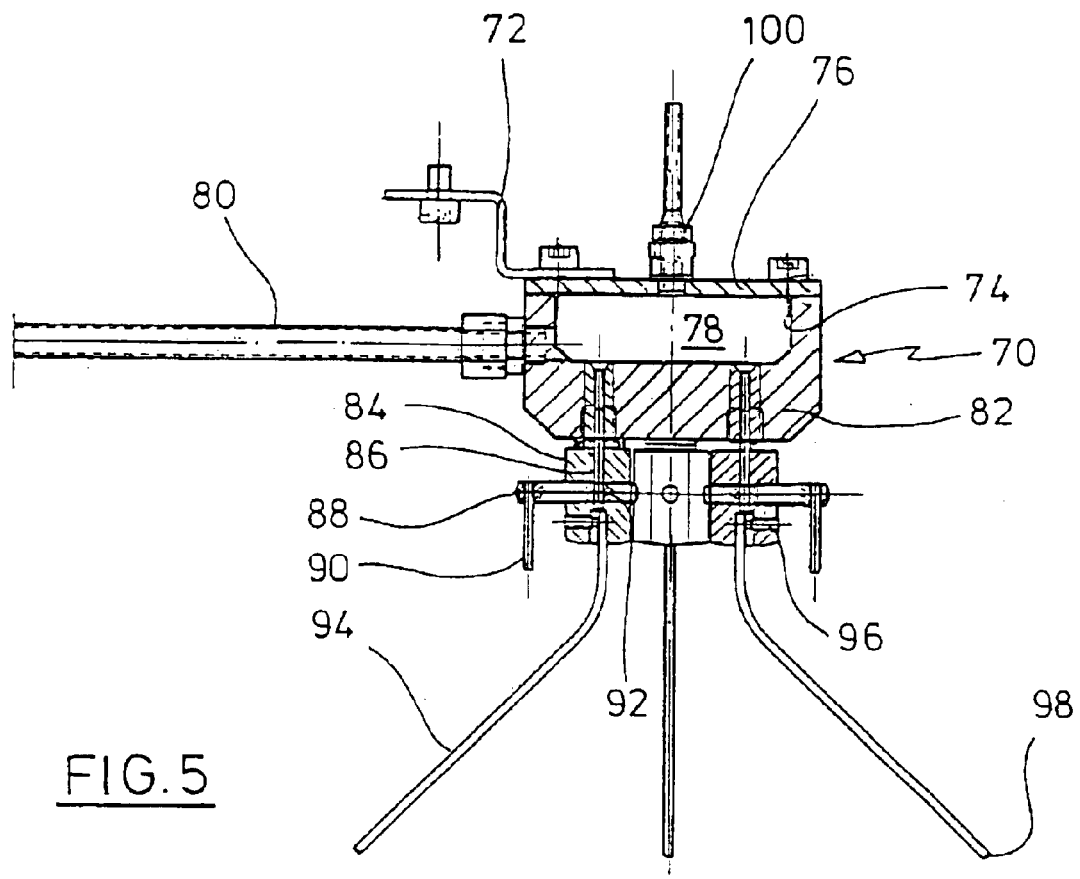
FIG. 5 shows a section through a nozzle block of the device of FIG. 1.
Figure 6:
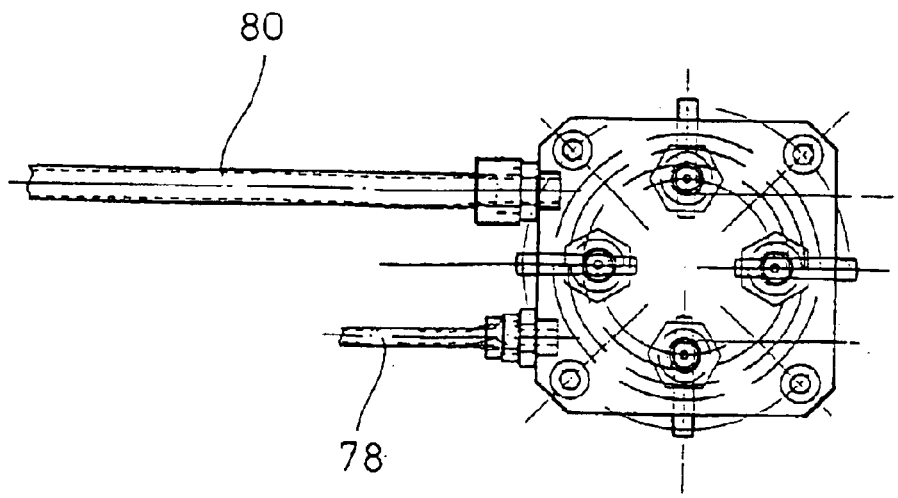
FIG. 6 shows a plan view of the nozzle block of the device of FIG. 5.

In operation, one storage disc each is positioned on the polishing plate 14 between adjacent roller holders 28, namely in the area as is shown in FIG. 1. Subsequently, the load-applying plates 26 are centrically placed onto the storage discs. The polishing plate 14 is set into rotation afterwards. The result is that the load-applying plates 26, along with the storage discs, automatically get into the positions illustrated in FIG. 1. The electric motors 44 are triggered simultaneously or subsequently so that they drive the rollers 38, which causes the storage discs to rotate with the load-applying plates 26. This is the way the polishing process is carried out. The process requires a polishing medium which is fed from top, namely by means of a device as is illustrated in FIGS. 5 and 6.

A square-shaped block 70 is centrally located above the polishing plate 14 and is kept stationary by means of a retaining plate 72 in a way which is not shown in detail. The upper side of the block 70 has disposed thereon an indentation 74 which is closed by a lid 76, thus forming a chamber 78. The chamber communicates with a feed line 78 (FIG. 6) for a flowable polishing medium, and with a return line 80. The two lines 78, 80 communicate with a source of the polishing medium that is not shown, e.g. a reservoir and a pump. The bottom 82 of the block 70 has screwed therein four valve blocks 84, which have an axial through bore 86, in a square arrangement. Pins 88 which are externally fitted with a handle 90 for turning the pins are inserted transversely to the through bore. The pins have a transverse through bore 92 which, when turned, are capable of varying the cross-section of flow. Thus, polishing medium from the chamber 78 flows downwards through the bores 86. The lower side of each valve block has joined thereto a wire 94. It is clamped in place in a respective bore, which is aligned with the through bore 86, by means of a pin screw 96. The wires 94 initially run downwards vertically and are then bent away towards the side. The lower end 98 of the wires terminates shortly above the polishing cloth on the annular surface 22 (FIG. 1). The polishing medium runs along the wires 94 and, in this way, reaches the polishing cloth on the annular surface 22. Since the load-applying plates 26 rotate the polishing medium will also transferred to the polishing cloth on the annular surface 22. Since the polishing medium can be relatively aggressive the elements described are made of a little corrodible material. Thus, for example, the wires 94 are of stainless steel.

The lid 76 has connected thereto an air relief tube 100 which ascertains whether there is a polishing medium in the chamber 78. If this is not the case a corresponding signal is emitted.

As was mentioned already excessive polishing medium which gathers in the indentation 16 and the ring-shaped recess 18 can get to the outside through the ducts 24 and flow into the tray 10, from which place it is passed to a suitable collection container.

The above Examples and disclosure are intended to be illustrative and not exhaustive. These examples and description will suggest many variations and alternatives to one of ordinary skill in this art. All these alternative and variations are intended to be included within the scope of the attached claims. Those familiar with the art may recognize other equivalents to the specific embodiments described herein which equivalents are also intended to be encompassed by the claims attached hereto.

What is claimed is:

1. A device for polishing digital storage discs having the features below:
   a polishing plate (14) rotatably driven about a vertical axis the upper side of which has a polishing cloth, wherein:
   the polishing cloth is interrupted by a ring-shaped recess (18) concentric with the axis of the polishing plate (14),
   at least one circular load-applying plate (16) from the planar lower side of which a projection (32) centrally protrudes to appropriately engage the central hole of the storage disk,
   a roller holder (28) which has at least one idling roller (36) and one driven roller (38) against which the circumference of said load-applying plate (16) gets into engagement when said plate said is carried along while lying on said polishing plate (14), wherein:
   the position of said rollers (36, 38) is such that the projection of said load-applying plate (16) is located above said ring-shaped recess (18) when said load-applying plate (16) bears on the rollers (36,38),
   a drive (44) for said driven roller (38), and
   mechanism for feeding a polishing medium to said polishing cloth.

2. The device as claimed in claim 1, characterized in that said polishing plate (14) is disposed in a tray (10).

3. The device as claimed in claim 1, characterized in that said polishing cloth is positioned on two annular surfaces (20, 22) of said polishing plate (14) which are separated by said ring-shaped recess (18) and said polishing plate (14) has a groove-shaped indentation adjacent to the inner annular surface (22).

4. The device as claimed in claim 3, characterized in that the tray-like indentation (16) is connected to a discharge duct (24) leading to said tray (10).

5. The device as claimed in claim 4, characterized in that said discharge duct (24) extends up to the circumference of said polishing plate (14) and crosses said ring-shaped recesses (18).

6. The device as claimed in claim 1, characterized in that said feeding mechanism has an adjustable nozzle (84) arranged above the polishing plate (14) which communicates with a source of the polishing medium and which communicates with at least one flow communication path the lower end of which is led to the polishing cloth.

7. The device as claimed in claim 6, characterized in that said flow communication path is formed by a wire (94) along which the polishing medium runs.

8. The device as claimed in claim 6, characterized in that a chamber (78) communicating with said source of said polishing medium is arranged above said nozzle (84) and a return line (80) communicates with said chamber (78) to permanently agitate the polishing medium between said source and chamber (78).

9. The device as claimed in claim 7, characterized in that the upper end of said wire (94) is clamped below a flow-through bore (86) in the nozzle body.

10. The device as claimed in claim 1, characterized in that the driving motor (44) is mounted on said roller holder (28).

11. The device as claimed in any one of claim 1, characterized in that said idling roller (36) is carried farther inwardly with respect to said driven roll (38).

12. The device as claimed in claim 10, characterized in that said driven roller (38) is directly seated on the vertically arranged shaft (42) of an electric motor (44).

13. The device as claimed in claim 1, characterized in that said roller holder (28) is adjustably mounted on a stationary support (58).

14. The device as claimed in claim 1, characterized in that said driven roller (38) circumferentially has a plurality of rings (54) which are preferably square-shaped in section and are made of a flexible material.

15. The device as claimed in claim 1, characterized in that said circumference of said load-applying plate (16) has a knurled area with which the driven roller (38) can be brought into engagement.

16. The device as claimed in claim 1, characterized in that said projection (32) of a load-applying plate is defined by an exchangeable pin (30) which is introduced into the load-applying plate (16) from top.

17. The device as claimed in claim 1, characterized in that a cloth is adhered to the lower side of the load-applying plate (16).

18. The device as claimed in claim 1, characterized in that said polishing plate (14) is made of aluminum or another light alloy.

* * * * *